(12) United States Patent
Lee

(10) Patent No.: US 9,039,565 B2
(45) Date of Patent: May 26, 2015

(54) MULTI-SPEED TRANSMISSION

(71) Applicant: GM Global Technology Operations LLC, Detroit, MI (US)

(72) Inventor: Chi Teck Lee, Noblesville, IN (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 14/039,810

(22) Filed: Sep. 27, 2013

(65) Prior Publication Data

US 2014/0100073 A1    Apr. 10, 2014

Related U.S. Application Data

(60) Provisional application No. 61/711,743, filed on Oct. 10, 2012.

(51) Int. Cl.
| | |
|---|---|
| *F16H 37/06* | (2006.01) |
| *F16H 3/44* | (2006.01) |
| *F16H 3/62* | (2006.01) |
| *F16H 3/66* | (2006.01) |

(52) U.S. Cl.
CPC .. *F16H 3/62* (2013.01); *F16H 3/66* (2013.01); *F16H 2200/0069* (2013.01); *F16H 2200/2012* (2013.01); *F16H 2200/2046* (2013.01)

(58) Field of Classification Search
CPC .............. F16H 3/62; F16H 2200/2012; F16H 2200/2046; F16H 2200/0069

USPC .......................... 475/275–277, 282, 288, 330
See application file for complete search history.

(56) References Cited

U.S. PATENT DOCUMENTS

| | | | | |
|---|---|---|---|---|
| 7,704,181 | B2* | 4/2010 | Phillips et al. | 475/275 |
| 7,722,496 | B2* | 5/2010 | Phillips et al. | 475/276 |
| 7,736,263 | B2* | 6/2010 | Phillips et al. | 475/277 |
| 7,824,299 | B2* | 11/2010 | Hart et al. | 475/275 |
| 7,828,690 | B2* | 11/2010 | Wittkopp et al. | 475/280 |
| 7,896,774 | B2* | 3/2011 | Phillips et al. | 475/275 |
| 8,007,394 | B2* | 8/2011 | Phillips et al. | 475/275 |
| 8,202,190 | B2* | 6/2012 | Phillips et al. | 475/275 |
| 8,333,676 | B2* | 12/2012 | Kim | 475/277 |
| 8,888,648 | B2* | 11/2014 | Mellet et al. | 475/275 |
| 2008/0182706 | A1* | 7/2008 | Phillips et al. | 475/276 |
| 2009/0011891 | A1* | 1/2009 | Phillips et al. | 475/275 |
| 2009/0124448 | A1* | 5/2009 | Wittkopp et al. | 475/275 |
| 2009/0192010 | A1* | 7/2009 | Wittkopp et al. | 475/275 |
| 2010/0190600 | A1* | 7/2010 | Phillips et al. | 475/275 |
| 2010/0279814 | A1* | 11/2010 | Brehmer et al. | 475/275 |
| 2012/0053005 | A1* | 3/2012 | Beck et al. | 475/275 |

* cited by examiner

*Primary Examiner* — Roger Pang
*Assistant Examiner* — Tinh Dang

(57) ABSTRACT

A transmission is provided having an input member, an output member, at least four planetary gear sets, a plurality of coupling members and a plurality of torque transmitting devices. Each of the planetary gear sets includes first, second and third members. The torque transmitting devices include clutches and brakes actuatable in combinations of three to establish a plurality of forward gear ratios and at least one reverse gear ratio.

22 Claims, 3 Drawing Sheets

| GEAR STATE | GEAR RATIO | RATIO STEP | TORQUE TRANSMITTING ELEMENTS | | | | | |
|---|---|---|---|---|---|---|---|---|
| | | | 32 | 34 | 26 | 30 | 28 | 24 |
| REV | -4.305 | | X | X | | X | | |
| N | | -1.01 | | | | | | |
| 1ST | 4.267 | | X | X | X | | | |
| 2ND | 2.685 | 1.59 | X | X | | | X | |
| 3RD | 2.078 | 1.29 | X | | X | | X | |
| 4TH | 1.779 | | X | | | X | X | |
| 4TH | 1.779 | | X | | | X | | X |
| 4TH | 1.779 | | X | | | | X | X |
| 5TH | 1.504 | 1.18 | X | | X | | | X |
| 6TH | 1.272 | 1.18 | X | | X | X | | |
| 7TH | 1.000 | 1.27 | | | X | X | X | |
| 7TH | 1.000 | | | | X | X | | X |
| 7TH | 1.000 | | | | X | | X | X |
| 8TH | 0.852 | 1.17 | | X | X | X | | |
| 9TH | 0.689 | 1.24 | | X | X | | | X |
| 10TH | 0.629 | 1.10 | | X | | X | X | |
| 10TH | 0.629 | | | X | | X | | X |
| 10TH | 0.629 | 1.09 | | X | | | X | X |

X = ON - ENGAGED CARRYING TORQUE

FIG. 5

MULTI-SPEED TRANSMISSION

CROSS-REFERENCE TO RELATED APPLICATIONS

This application claims the benefit of U.S. Provisional Application No. 61/711,743 filed Oct. 10, 2012. The disclosure of the above application is incorporated herein by reference.

FIELD

The invention relates generally to a multiple speed transmission, and more particularly, to a transmission having a plurality speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness, and improved packaging, primarily reduced size and weight, is essentially constant. Accordingly, there is a need for an improved, cost-effective, compact multiple speed transmission.

SUMMARY

A transmission is provided having an input member, an output member, at least four planetary gear sets, a plurality of coupling members and a plurality of torque transmitting devices. Each of the planetary gear sets includes first, second and third members. The torque transmitting devices may be, for example, clutches and brakes.

The clutches and brakes can be of any type including but not limited to a fiction clutch, a friction band, a one way clutch, a selectable one way clutch, a dog clutch, a synchronizer and similar devices. Furthermore, any node can use a single device or a combination of these devices e.g. the first brake may be configured as a dog clutch and a one way clutch combination or a one way clutch and friction clutch combination. Similarly, several other combinations are possible.

In another embodiment of the present invention, the transmission includes: first, second, third and fourth planetary gear sets each having a sun gear, a carrier member and a ring gear, and the input member is continuously connected for common rotation with the carrier member of the second planetary gear set, and the output member is continuously connected for common rotation with the carrier member of the fourth planetary gear set.

In yet another embodiment of the present invention, the transmission includes a first interconnecting member that continuously interconnects the sun gear of the first planetary gear set with the sun gear of the second planetary gear set.

In yet another embodiment of the present invention, the transmission includes a second interconnecting member that continuously interconnects the carrier member of the first planetary gear set with the ring gear of the fourth planetary gear set.

In yet another embodiment of the present invention, the transmission includes a third interconnecting member that continuously interconnects the ring gear of the second planetary gear set with the sun gear of the third planetary gear set.

In yet another embodiment of the present invention, the transmission includes a fourth interconnecting member that continuously interconnects the ring gear of the third planetary gear set with the sun gear of the fourth planetary gear set.

In still another embodiment of the present invention, the transmission includes a first torque transmitting mechanism that is selectively engageable to interconnect the carrier member of the first planetary gear set and the ring gear of the fourth planetary gear set with the ring gear of the second planetary gear set and the sun gear of the third planetary gear set.

In still another embodiment of the present invention, the transmission includes a second torque transmitting mechanism that is selectively engageable to interconnect the input member and the carrier member of the second planetary gear set with the ring gear of the third planetary gear set and the sun gear of the fourth planetary gear set.

In still another embodiment of the present invention, the transmission includes a third torque transmitting mechanism that is selectively engageable to interconnect the ring gear of the second planetary gear set and the sun gear of the third planetary gear set with the carrier member of the third planetary gear set.

In still another embodiment of the present invention, the transmission includes a fourth torque transmitting mechanism that is selectively engageable to interconnect the carrier member of the third planetary gear set with the carrier member of the first planetary gear set and the ring gear of the fourth planetary gear set.

In still another embodiment of the present invention, the transmission includes a fifth torque transmitting mechanism that is selectively engageable to interconnect the ring gear of the first planetary gear set with the stationary member.

In still another embodiment of the present invention, the transmission includes a sixth torque transmitting mechanism that is selectively engageable to interconnect the sun gear of the first planetary gear set and the sun gear of the second planetary gear set with the stationary member.

In yet another embodiment of the present invention, the torque transmitting mechanisms are selectively engageable in combinations of at least three to establish a plurality of forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 5 is a truth table presenting an example of a state of engagement of various torque transmitting elements to produce multiple forward and at least one reverse speed or gear ratios of the transmissions illustrated in FIGS. 1-4.

DETAILED DESCRIPTION

The following description is merely exemplary in nature and is not intended to limit the present disclosure, application, or uses.

At the outset, it should be appreciated that the embodiments of the multi-speed automatic transmission of the present invention have an arrangement of permanent mechanical connections between the elements of the four planetary gear sets. As used herein, coupling or interconnection refers to a direct, continuous, and permanent coupling or interconnection, for example by a rigid member or shaft, between elements. Selective coupling or interconnection, on the other hand, refers to a selective coupling by a clutch or brake, where the clutch or brake can be engaged and disengaged, such that when engaged, the selectively coupled or interconnected elements rotate together, but when disengaged, the selectively coupled or interconnected elements are free to rotate independently.

In one embodiment, a first component or element of the first planetary gear set is permanently coupled to a first component or element of the second planetary gear set. A second component or element of the first planetary gear set is permanently coupled to a third component or element of the fourth planetary gear set. A third component or element of the second planetary gear set is permanently coupled to a third component or element of the third planetary gear set. A first component or element of the third planetary gear set is permanently coupled to a first component or element of the fourth planetary gear set.

Figure 1:
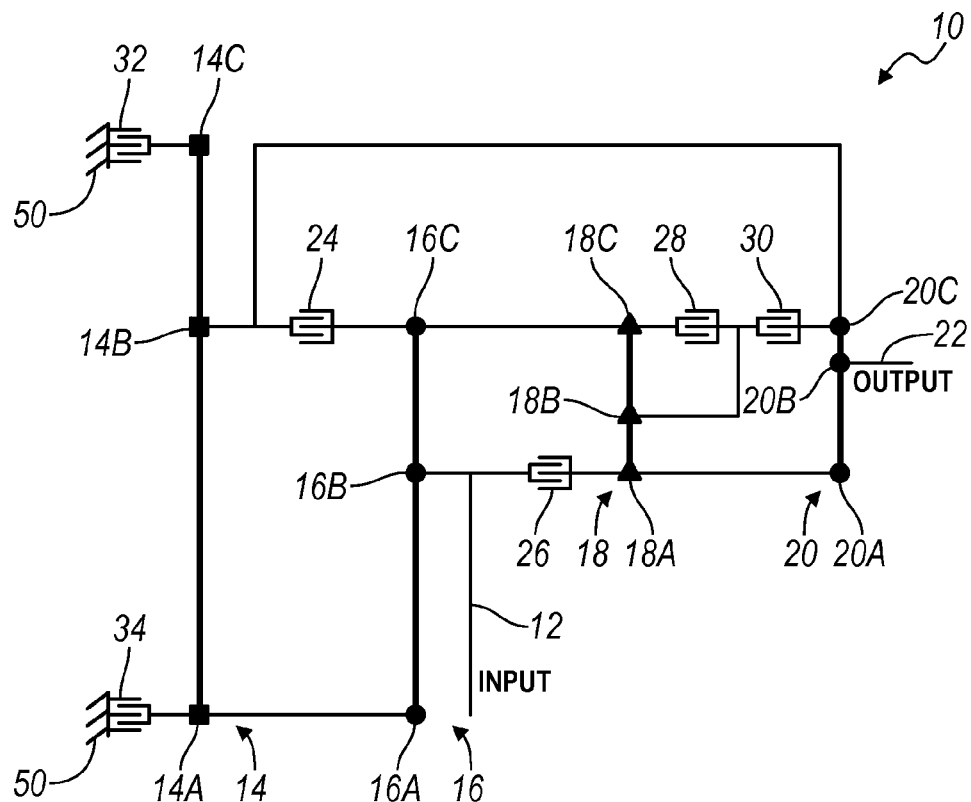
FIG. 1 is a lever diagram of an embodiment of a transmission according to the principles of present invention.

Referring now to FIG. 1, an embodiment of a multi-speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines, and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18, a fourth planetary gear set 20, and an output shaft or member 22. In the lever diagram of FIG. 1, the first planetary gear set 14 has three nodes: a first node 14A, a second node 14B, and a third node 14C. The second planetary gear set 16 has three nodes: a first node 16A, a second node 16B and a third node 16C. The third planetary gear set 18 has three nodes: a first node 18A, a second node 18B and a third node 18C. The fourth planetary gear set 20 has three nodes: a first node 20A, a second node 20B and a third node 20C.

The input member 12 is continuously coupled to the second node 16B of the second planetary gear set 16. The output member 22 is continuously coupled to the second node 20B of the fourth planetary gear set 20.

The first node 14A of the first planetary gear set 14 is coupled to the first node 16A of the second planetary gear set 16. The second node 14B of the first planetary gear set 14 is coupled to the third node 20C of the fourth planetary gear set 20. The third node 16C of the second planetary gear set 16 is coupled to the third node 18C of the third planetary gear set 18. The first node 18A of the third planetary gear set 18 is coupled to the first node 20A of the fourth planetary gear set 20.

A first clutch 24 selectively connects the second node 14B of the first planetary gear set 14 and the third node 20C of the fourth planetary gear set 20 with the third node 16C of the second planetary gear set 16 and the third node 18C of the third planetary gear set 18. A second clutch 26 selectively connects the second node 16B of the second planetary gear set 16 and the input member 12 with the first node 18A of the third planetary gear set 18 and the first node 20A of the fourth planetary gear set 20. A third clutch 28 selectively connects the third node 18C of the third planetary gear set 18 and the third node 16C of the second planetary gear set 16 with the second node 18B of the third planetary gear set 18. A fourth clutch 30 selectively connects the second node 18B of the third planetary gear set 18 with the second node 14B of the first planetary gear set 14 and the third node 20C of the fourth planetary gear set 20.

A first brake 32 selectively connects the third node 14C of the first planetary gear set 14 with the stationary member or transmission housing 50. A second brake 34 selectively connects the first node 14A of the first planetary gear set 14 and the first node 16A of the second planetary gear set 16 with the stationary member or transmission housing 50.

Figure 2:
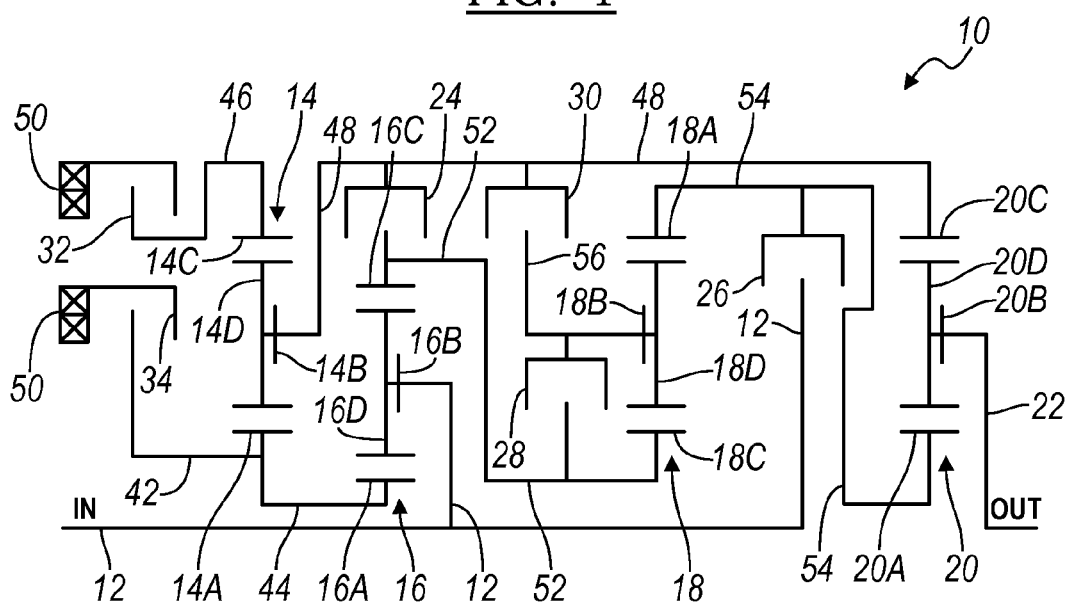
FIG. 2 is a diagrammatic illustration of a variation of the transmission of FIG. 1 according to the principles of the present invention.

Referring now to FIG. 2, a stick diagram presents a schematic layout of an embodiment of the multi-speed transmission 10 according to one form of the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the first planetary gear set 14 includes a sun gear member 14A, a ring gear member 14C, and a planet gear carrier member 14B that rotatably supports a set of planet gears 14D (only one of which is shown). The sun gear member 14A is connected for common rotation with a first shaft or interconnecting member 42 and with a second shaft or interconnecting member 44. The ring gear member 14C is connected for common rotation with a third shaft or interconnecting member 46. The planet carrier member 14B is connected for common rotation with a fourth shaft or interconnecting member 48. The set of planet gears 14D are each configured to intermesh with both the sun gear member 14A and the ring gear member 14C.

The second planetary gear set 16 includes a sun gear member 16A, a ring gear member 16C, and a planet gear carrier member 16B that rotatably supports a set of planetary gears 16D (only one of each is shown). The sun gear member 16A is connected for common rotation with the second shaft or interconnecting member 44. The ring gear member 16C is connected for common rotation with a fifth shaft or interconnecting member 52. The planet carrier member 16B is connected for common rotation with the input shaft or member 12. The planet gears 16D are each configured to intermesh with both the ring gear member 16C and the sun gear member 16A.

The third planetary gear set 18 includes a sun gear member 18C, a ring gear member 18A, and a planet gear carrier member 18B that rotatably supports a set of planet gears 18D (only one of which is shown). The sun gear member 18C is connected for common rotation with the fifth shaft or interconnecting member 52. The ring gear member 18A is connected for common rotation with a sixth shaft or interconnecting member 54. The planet carrier member 18B is connected for common rotation with a seventh shaft or interconnecting member 56. The planet gears 18D are each configured to intermesh with both the sun gear member 18C and the ring gear member 18A.

The fourth planetary gear set 20 includes a sun gear member 20A, a ring gear member 20C and a planet gear carrier member 20B that rotatably supports a set of planet gears 20D (only one of which is shown). The sun gear member 20A is connected for common rotation with the sixth shaft or interconnecting member 54. The ring gear member 20C is connected for common rotation with the fourth shaft or interconnecting member 48. The planetary gear carrier member 20B is connected for common rotation with the output shaft or member 22. The planet gears 20D are each configured to intermesh with both the sun gear member 20A and the ring gear member 20C.

The input shaft or member 12 is continuously connected to an input source, such as an engine (not shown) or a turbine of a torque converter (not shown). The output shaft or member 22 is continuously connected with another output such as the final drive unit or transfer case (not shown).

The torque-transmitting mechanisms, including the first, second, third and fourth clutches 24, 26, 28, 30 and the first and second brakes 32 and 34 allow for selective interconnection of the shafts or interconnecting members 42, 44, 46, 48, 52, 54, and 56 of the planetary gear sets 14, 16, 18, 20 and the housing 50.

For example, the first clutch 24 is selectively engageable to connect the fourth shaft or interconnecting member 48 with the fifth shaft or interconnecting member 52. The second clutch 26 is selectively engageable to connect the input shaft or member 12 with the sixth shaft or interconnecting member 54. The third clutch 28 is selectively engageable to connect the fifth shaft or interconnecting member 52 with the seventh shaft or interconnecting member 56. The fourth clutch 30 is selectively engageable to connect the fourth shaft or interconnecting member 48 with the seventh shaft or interconnecting member 56.

The first brake 32 is selectively engageable to connect the third shaft or interconnecting member 46 with the stationary element or the transmission housing 50 in order to restrict the member 46 from rotating relative to the transmission housing 50. The second brake 34 is selectively engageable to connect the first shaft or interconnecting member 42 with the stationary element or the transmission housing 50 in order to restrict the member 42 from rotating relative to the transmission housing 50. In turn, the components of the planetary gear sets connected to each of the connecting members are also connected or restricted accordingly.

Figure 3:
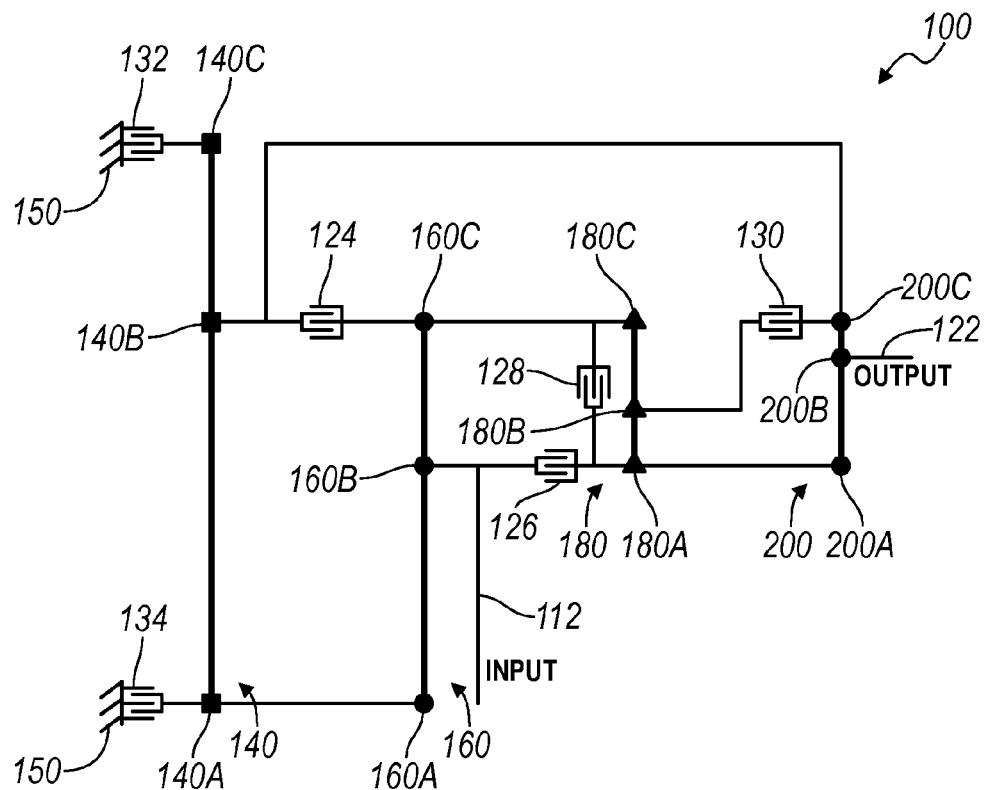
FIG. 3 is a lever diagram of an embodiment of a transmission according to the principles of present invention.
Figure 4:
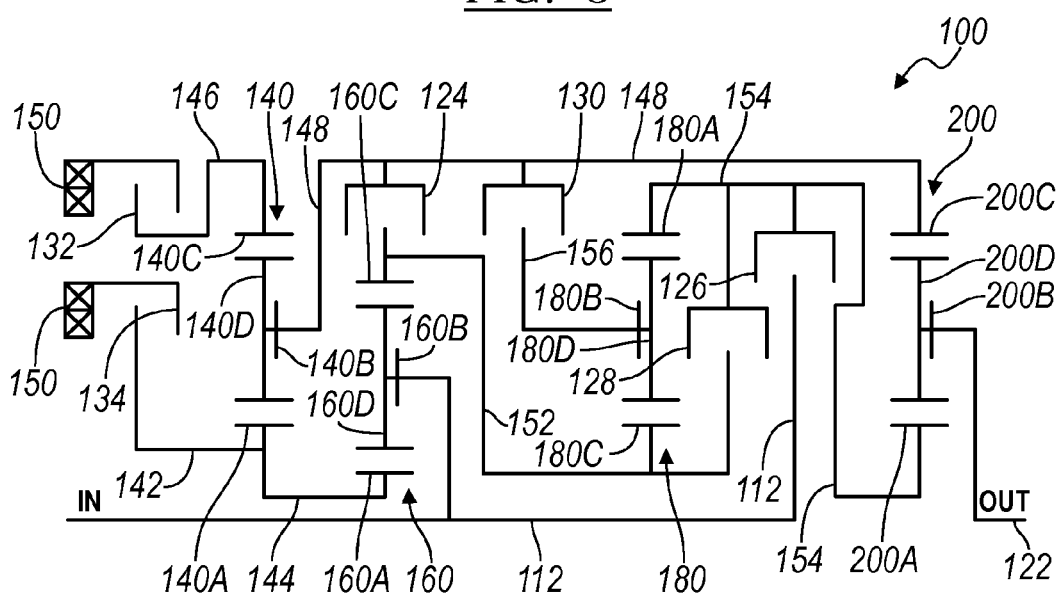
FIG. 4 is a diagrammatic illustration of a variation of the transmission of FIG. 3 according to the principles of the present invention.

Additionally, the present invention contemplates other embodiments of a multi-speed automatic transmission as illustrated in FIGS. 3 and 4 and referenced as transmission 100. For example, in FIG. 3 transmission 100 is shown in lever diagram form. The transmission 100 includes an input shaft or member 112, a first planetary gear set 140, a second planetary gear set 160, a third planetary gear set 180, a fourth planetary gear set 200, and an output shaft or member 122. The first planetary gear set 140 has three nodes: a first node 140A, a second node 140B, and a third node 140C. The second planetary gear set 160 has three nodes: a first node 160A, a second node 160B and a third node 160C. The third planetary gear set 180 has three nodes: a first node 180A, a second node 180B and a third node 180C. The fourth planetary gear set 200 has three nodes: a first node 200A, a second node 200B and a third node 200C. The input member 112 is continuously coupled to the second node 160B of the second planetary gear set 160. The output member 122 is continuously coupled to the second node 200B of the fourth planetary gear set 200.

The first node 140A of the first planetary gear set 140 is coupled to the first node 160A of the second planetary gear set 160. The second node 140B of the first planetary gear set 140 is coupled to the third node 200C of the fourth planetary gear set 200. The third node 160C of the second planetary gear set 160 is coupled to the third node 180C of the third planetary gear set 180. The first node 180A of the third planetary gear set 180 is coupled to the first node 200A of the fourth planetary gear set 200.

A first clutch 124 selectively connects the second node 140B of the first planetary gear set 140 and the third node 200C of the fourth planetary gear set 200 with the third node 160C of the third planetary gear set 160 and the third node 180C of the third planetary gear set 180. A second clutch 126 selectively connects the second node 160B of the second planetary gear set 160 and the input member 112 with the first node 180A of the third planetary gear set 180 and the first node 200A of the fourth planetary gear set 200. A third clutch 128 selectively connects the third node 180C of the third planetary gear set 180 and the third node 160C of the second planetary gear set 160 with the first node 180A of the third planetary gear set 180 and the first node 200A of the fourth planetary gear set 200. A fourth clutch 130 selectively connects the second node 180B of the third planetary gear set 180 with the second node 140B of the first planetary gear set 140 and the third node 200C of the fourth planetary gear set 200.

A first brake 132 selectively connects the third node 140C of the first planetary gear set 140 with the stationary member or transmission housing 150. A second brake 134 selectively connects the first node 140A of the first planetary gear set 140 and the first node 160A of the second planetary gear set 160 with the stationary member or transmission housing 150.

Referring now to FIG. 4, a stick diagram presents a schematic layout of an embodiment of the multi-speed transmission 100 according to one form of the present invention. In FIG. 4, the numbering from the lever diagram of FIG. 3 is carried over. The clutches and couplings are correspondingly presented whereas the nodes of the planetary gear sets now appear as components of planetary gear sets such as sun gears, ring gears, planet gears and planet gear carriers.

For example, the first planetary gear set 140 includes a sun gear member 140A, a ring gear member 140C, and a planet gear carrier member 140B that rotatably supports a set of planet gears 140D (only one of which is shown). The sun gear member 140A is connected for common rotation with a first shaft or interconnecting member 142 and with a second shaft or interconnecting member 144. The ring gear member 140C is connected for common rotation with a third shaft or interconnecting member 146. The planet carrier member 140B is connected for common rotation with a fourth shaft or interconnecting member 148. The set of planet gears 140D are each configured to intermesh with both the sun gear member 140A and the ring gear member 140C.

The second planetary gear set 160 includes a sun gear member 160A, a ring gear member 160C, and a planet gear carrier member 160B that rotatably supports a set of planetary gears 160D (only one of each is shown). The sun gear member 160A is connected for common rotation with the second shaft or interconnecting member 144. The ring gear member 160C is connected for common rotation with a fifth shaft or interconnecting member 152. The planet carrier member 160B is connected for common rotation with the input shaft or member 112. The planet gears 160D are each configured to intermesh with both the ring gear member 160C and the sun gear member 160A.

The third planetary gear set 180 includes a sun gear member 180C, a ring gear member 180A, and a planet gear carrier member 180B that rotatably supports a set of planet gears 180D (only one of which is shown). The sun gear member 180C is connected for common rotation with the fifth shaft or interconnecting member 152. The ring gear member 180A is connected for common rotation with a sixth shaft or interconnecting member 154. The planet carrier member 180B is connected for common rotation with a seventh shaft or interconnecting member 156. The planet gears 180D are each configured to intermesh with both the sun gear member 180C and the ring gear member 180A.

The fourth planetary gear set 200 includes a sun gear member 200A, a ring gear member 200C and a planet gear carrier member 200B that rotatably supports a set of planet gears 200D (only one of which is shown). The sun gear member 200A is connected for common rotation with the sixth shaft or interconnecting member 154. The ring gear member 200C is connected for common rotation with the fourth shaft or interconnecting member 148. The planetary gear carrier member 200B is connected for common rotation with the output shaft or member 122. The planet gears 200D are each configured to intermesh with both the sun gear member 200A and the ring gear member 200C.

The input shaft or member 112 is continuously connected to an input source, such as an engine (not shown) or a turbine of a torque converter (not shown). The output shaft or member 122 is continuously connected with another output such as the final drive unit or transfer case (not shown).

The torque-transmitting mechanisms, including the first, second, third and fourth clutches 124, 126, 128, 130 and the first and second brakes 132 and 134 allow for selective interconnection of the shafts or interconnecting members 142, 144, 146, 148, 152, 154, and 156 of the planetary gear sets 140, 160, 180, 200 and the housing 150.

For example, the first clutch 124 is selectively engageable to connect the fourth shaft or interconnecting member 148 with the fifth shaft or interconnecting member 152. The second clutch 126 is selectively engageable to connect the input shaft or member 112 with the sixth shaft or interconnecting member 154. The third clutch 128 is selectively engageable to connect the fifth shaft or interconnecting member 152 with the sixth shaft or interconnecting member 154. In an alternate embodiment of the present invention, the third clutch 128 interconnects the sixth shaft or interconnecting member 154, the first member 180A of the third planetary gear set 180 and the first member 200A of the fourth planetary gear set 200 with the seventh shaft or interconnecting member 156 and the second member 180B of the third planetary gear set 180. The fourth clutch 130 is selectively engageable to connect the fourth shaft or interconnecting member 148 with the seventh shaft or interconnecting member 156.

The first brake 132 is selectively engageable to connect the third shaft or interconnecting member 146 with the stationary element or the transmission housing 150 in order to restrict the member 146 from rotating relative to the transmission housing 150. The second brake 134 is selectively engageable to connect the first shaft or interconnecting member 142 with the stationary element or the transmission housing 150 in order to restrict the member 142 from rotating relative to the transmission housing 150. In turn, the components of the planetary gear sets connected to each of the connecting members are also connected or restricted accordingly.

Referring now to FIGS. 1, 2, 3, 4 and FIG. 5, the operation of the multi-speed transmissions 10 and 100 will be described. It will be appreciated that transmissions 10 and 100 are capable of transmitting torque from the input shaft or member 12, 112 to the output shaft or member 22, 122 in multiple forward speed torque ratios and at least one reverse speed or torque ratio. Each forward and reverse speed or torque ratio is attained by engagement of one or more of the torque-transmitting mechanisms (i.e. first clutch 24, 124, second clutch 26, 126, third clutch 28, 128, fourth clutch 30, 130, first brake 32, 132 and second brake 34, 134), as will be explained below.

FIG. 5 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmissions 10 and 100. Of course, other gear ratios are achievable depending on the gear diameter, gear teeth count and gear configuration selected.

For example, with respect to transmission 10, a reverse gear is established by engaging or activating the fourth clutch 30, the first brake 32 and the second brake 34. The fourth clutch 30 connects the fourth shaft or interconnecting member 48 with the seventh shaft or interconnecting member 56. The first brake 32 connects the third shaft or interconnecting member 46 with the stationary element or the transmission housing 50 in order to restrict the member 46 from rotating relative to the transmission housing 50, which restricts the ring gear 14C from rotating relative to the transmission housing 50. The second brake 34 connects the first shaft or interconnecting member 42 with the stationary element or the transmission housing 50 in order to restrict the member 42 from rotating relative to the transmission housing 50, which restricts the sun gears 14A and 16A from rotating relative to the transmission housing 50. Likewise, ten forward ratios are achieved through different combinations of clutch and brake engagement, as shown in FIG. 5, by way of example. Moreover, the present invention contemplates additional or alternative combinations of clutch and brake engagement to achieve the fourth, seventh and tenth gear ratios as shown in FIG. 5.

Moreover, with respect to transmission 100, a reverse gear is established by engaging or activating the fourth clutch 130, the first brake 132 and the second brake 134. The fourth clutch 130 connects the fourth shaft or interconnecting member 148 with the seventh shaft or interconnecting member 156. The first brake 132 connects the third shaft or interconnecting member 146 with the stationary element or the transmission housing 150 in order to restrict the member 146 from rotating relative to the transmission housing 150, which restricts the ring gear 140C from rotating relative to the transmission housing 150. The second brake 134 connects the first shaft or interconnecting member 142 with the stationary element or the transmission housing 150 in order to restrict the member 142 from rotating relative to the transmission housing 150, which restricts the sun gears 140A and 160A from rotating relative to the transmission housing 150. Likewise, ten forward ratios are achieved through different combinations of clutch and brake engagement, as shown in FIG. 5, by way of example. Moreover, the present invention contemplates additional or alternative combinations of clutch and brake engagement to achieve the fourth, seventh and tenth gear ratios as shown in FIG. 5.

It will be appreciated that the foregoing explanation of operation and gear states of the multi-speed embodiment of transmissions 10 and 100 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated. Further, the operation and establishment of various gear ratios of transmissions 10 and 100 are for example provided by the engagement of the torque transmitting elements, as shown in FIG. 5.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
an input member;
an output member;
first, second, third and fourth planetary gear sets each having first, second and third members, and wherein the input member is directly connected to one of the first, second and third members of one of the first, second, third and fourth planetary gear sets and the output member is directly connected to another one of the first, second and third members of another one of the first, second, third and fourth planetary gear sets;
a first interconnecting member continuously interconnecting the first member of the first planetary gear set with the first member of the second planetary gear set;
a second interconnecting member continuously interconnecting the second member of the first planetary gear set with the third member of the fourth planetary gear set;
a third interconnecting member continuously interconnecting the third member of the second planetary gear set with the third member of the third planetary gear set;
a fourth interconnecting member continuously interconnecting the first member of the third planetary gear set with the first member of the fourth planetary gear set;
six torque transmitting mechanisms wherein four of the six torque transmitting mechanisms are each selectively engageable to interconnect at least one of the first, second and third members with at least one other of the first, second, third members and wherein two of the six torque transmitting mechanisms are each selectively engageable to interconnect at least one of the first, second and third members with a stationary member, and
wherein the six torque transmitting mechanisms are selectively engageable in combinations of at least three to establish a plurality of forward speed ratios and at least one reverse speed ratio between the input member and the output member and a first of the six torque transmitting mechanisms is selectively engageable to interconnect the second member of the first planetary gear set and the third member of the fourth planetary gear set with the third member of the second planetary gear set and the third member of the third planetary gear set.

2. The transmission of claim 1 wherein a second of the six torque transmitting mechanisms is selectively engageable to interconnect the input member and the second member of the second planetary gear set with the first member of the third planetary gear set and the first member of the fourth planetary gear set.

3. The transmission of claim 2 wherein a third of the six torque transmitting mechanisms is selectively engageable to interconnect the third member of the second planetary gear set and the third member of the third planetary gear set with the second member of the third planetary gear set.

4. The transmission of claim 2 wherein a third of the six torque transmitting mechanisms is selectively engageable to interconnect the first member of the third planetary gear set and the first member of the fourth planetary gear set with the second member of the second planetary gear set and the third member of the third planetary gear set.

5. The transmission of claim 2 wherein a third of the six torque transmitting mechanisms is selectively engageable to interconnect the first member of the third planetary gear set and the first member of the fourth planetary gear set with the second member of the second planetary gear set.

6. The transmission of claim 3 wherein a fourth of the six torque transmitting mechanisms is selectively engageable to interconnect the second member of the third planetary gear set with the second member of the first planetary gear set and the third member of the fourth planetary gear set.

7. The transmission of claim 6 wherein a fifth of the six torque transmitting mechanisms is selectively engageable to interconnect the third member of the first planetary gear set with the stationary member.

8. The transmission of claim 7 wherein a sixth of the six torque transmitting mechanisms is selectively engageable to interconnect the first member of the first planetary gear set and the first member of the second planetary gear set with the stationary member.

9. The transmission of claim 1 wherein the input member is continuously connected for common rotation with the second member of the second planetary gear set.

10. The transmission of claim 1 wherein the output member is continuously connected for common rotation with the second member of the fourth planetary gear set.

11. The transmission of claim 1 wherein the first member of the first planetary gear set, the first member of the second planetary gear set, the third member of the third planetary gear set and the first member of the fourth planetary gear set are sun gears, the second members of the first, second and fourth planetary gear sets and the third member of the third planetary gear set are carrier members and the third member of the first planetary gear set, the third member of the second planetary gear set, the first member of the third planetary gear set and the third member of the fourth planetary gear set are ring gears.

12. A transmission comprising:
an input member;
an output member;
first, second, third and fourth planetary gear sets each having first, second and third members, and wherein the input member is directly connected to one of the first, second and third members of one of the first, second, third and fourth planetary gear sets and the output member is directly connected to another one of the first, second and third members of another one of the first, second, third and fourth planetary gear sets;

a first interconnecting member continuously interconnecting the first member of the first planetary gear set with the first member of the second planetary gear set;

a second interconnecting member continuously interconnecting the second member of the first planetary gear set with the third member of the fourth planetary gear set;

a third interconnecting member continuously interconnecting the third member of the second planetary gear set with the third member of the third planetary gear set;

a fourth interconnecting member continuously interconnecting the first member of the third planetary gear set with the first member of the fourth planetary gear set; and six torque transmitting mechanisms each selectively engageable to interconnect at least one of the first, second, and third members with at least one other of the first, second, third members and a stationary member, and wherein the six torque transmitting mechanisms are selectively engageable in combinations of at least three to establish a plurality of forward speed ratios and at least one reverse speed ratio between the input member and the output member, a first of the six torque transmitting mechanisms is selectively engageable to interconnect the second member of the first planetary gear set and the third member of the fourth planetary gear set with the third member of the second planetary gear set and the third member of the third planetary gear set, and a second of the six torque transmitting mechanisms is selectively engageable to interconnect the input member and the second member of the second planetary gear set with the first member of the third planetary gear set and the first member of the fourth planetary gear set.

13. The transmission of claim 12 wherein a third of the six torque transmitting mechanisms is selectively engageable to interconnect the third member of the second planetary gear set and the third member of the third planetary gear set with the second member of the third planetary gear set.

14. The transmission of claim 12 wherein a third of the six torque transmitting mechanisms is selectively engageable to interconnect the first member of the third planetary gear set and the first member of the fourth planetary gear set with the third member of the second planetary gear set and the third member of the third planetary gear set.

15. The transmission of claim 12 wherein a third of the six torque transmitting mechanisms is selectively engageable to interconnect the first member of the third planetary gear set and the first member of the fourth planetary gear set with the second member of the second planetary gear set.

16. The transmission of claim 13 a fourth of the six torque transmitting mechanisms is selectively engageable to interconnect the second member of the third planetary gear set with the second member of the first planetary gear set and the third member of the fourth planetary gear set.

17. The transmission of claim 16 wherein a fifth of the six torque transmitting mechanisms is selectively engageable to interconnect the third member of the first planetary gear set with the stationary member.

18. The transmission of claim 17 wherein a sixth of the six torque transmitting mechanisms is selectively engageable to interconnect the first member of the first planetary gear set and the first member of the second planetary gear set with the stationary member.

19. The transmission of claim 12 wherein the input member is continuously connected for common rotation with the second member of the second planetary gear set.

20. The transmission of claim 12 wherein the output member is continuously connected for common rotation with the second member of the fourth planetary gear set.

21. The transmission of claim 12 wherein the first member of the first planetary gear set, the first member of the second planetary gear set, the third member of the third planetary gear set and the first member of the fourth planetary gear set are sun gears, the second members of the first, second and fourth planetary gear sets and the third member of the third planetary gear set are carrier members and the third member of the first planetary gear set, the third member of the second planetary gear set, the first member of the third planetary gear set and the third member of the fourth planetary gear set are ring gears.

22. A transmission comprising:

an input member;

an output member;

first, second, third and fourth planetary gear sets each having a sun gear, a carrier member and a ring gear, wherein the input member is continuously connected for common rotation with the carrier member of the second planetary gear set, and wherein the output member is continuously connected for common rotation with the carrier member of the fourth planetary gear set;

a first interconnecting member continuously interconnecting the sun gear of the first planetary gear set with the sun gear of the second planetary gear set;

a second interconnecting member continuously interconnecting the carrier member of the first planetary gear set with the ring gear of the fourth planetary gear set;

a third interconnecting member continuously interconnecting the ring gear of the second planetary gear set with the sun gear of the third planetary gear set;

a fourth interconnecting member continuously interconnecting the ring gear of the third planetary gear set with the sun gear of the fourth planetary gear set;

a first torque transmitting mechanism selectively engageable to interconnect the carrier member of the first planetary gear set and the ring gear of the fourth planetary gear set with the ring gear of the second planetary gear set and the sun gear of the third planetary gear set;

a second torque transmitting mechanism selectively engageable to interconnect the input member and the carrier member of the second planetary gear set with the ring gear of the third planetary gear set and the sun gear of the fourth planetary gear set;

a third torque transmitting mechanism selectively engageable to interconnect the ring gear of the second planetary gear set and the sun gear of the third planetary gear set with the carrier member of the third planetary gear set;

a fourth torque transmitting mechanism selectively engageable to interconnect the carrier member of the third planetary gear set with the carrier member of the first planetary gear set and the ring gear of the fourth planetary gear set;

a fifth torque transmitting mechanism selectively engageable to interconnect the ring gear of the first planetary gear set with the stationary member;

a sixth torque transmitting mechanism selectively engageable to interconnect the sun gear of the first planetary gear set and the sun gear of the second planetary gear set with the stationary member, and wherein the torque transmitting mechanisms are selectively engageable in combinations of at least three to establish a plurality of forward speed ratios and at least one reverse speed ratio between the input member and the output member.

* * * * *